UNITED STATES PATENT OFFICE.

EDWARD S. CHAPIN, OF NEW YORK, N. Y.

SULFUR DYE AND PROCESS OF MAKING SAME.

No. 909,155.  Specification of Letters Patent.  Patented Jan. 12, 1909.

Application filed February 6, 1907. Serial No. 355,969. Renewed September 24, 1908. Serial No. 454,540.

*To all whom it may concern:*

Be it known that I, EDWARD S. CHAPIN, a citizen of the United States, residing in the borough of Brooklyn, city and State of New York, have invented a new and useful Improvement in Sulfur Colors and Process of Making the Same, of which the following is a specification.

I have found that by heating a mixture of copper sulfate, sulfur, sodium sulfid and one of a number of various members of the chemical group denominated "carbohydrates" I have obtained new coloring matters. These new coloring matters are particularly fast to light and to washing.

Example: 126 grams of $Na_2S$ (Conc.) and 126 grams of water are heated together to solution (or 252 grams of $Na_2S$ crystals may be heated instead) ; 78 grams of sulfur are then dissolved in this solution. The solution is allowed to cool, and 90 grams of starch are added. Then 18 grams of copper sulfate crystals (bluestone) dissolved in 30 cubic centimeters of water are added to complete the components of the melt. The mass is then heated sufficiently to drive off the water; the temperature is then raised to 140° C. and maintained at that point for one hour; it is then raised to between 180° and 190° C. and maintained at that point for another hour, or until the full tinctorial power of the color has been developed.

The resulting product is readily soluble in cold water, cold caustic alkaline or alkali carbonate solution, and dyes cotton in an alkaline salt bath fast olive brown black shades.

The color produced by this dyestuff differs from that of the substance which would be formed without the use of the copper sulfate. This new dyestuff is especially superior in fastness to light to that formed without the use of the copper sulfate.

If other carbohydrates, such as grape sugar or gum arabic be substituted for starch, analogous products will be obtained.

I claim:

1. The process of making dyestuffs consisting in heating together a carbohydrate, sulfur, sodium sulfid and copper sulfate substantially as described.

2. The process of making dyestuffs consisting in heating together starch, sulfur, sodium sulfid and copper sulfate, substantially as described.

3. As a new article of manufacture the dyestuff obtained by heating starch, sulfur, sodium sulfid and copper sulfate in substantially the manner herein before specified, which is readily soluble in cold water, cold caustic alkaline or alkali carbonate solution, and dyes cotton in an alkaline salt bath fast olive brown black shades.

In testimony whereof I have hereunto signed my name in the presence of two subscribing witnesses.

EDWARD S. CHAPIN.

Witnesses:
FRITZ V. BRIESEN,
JOHN A. KEHLENBECK.